United States Patent [19]

Hwang

[11] Patent Number: 5,420,841
[45] Date of Patent: May 30, 1995

[54] SPINDLE MOTOR CONTROL CIRCUIT FOR OPTICAL RECORDING AND REGENERATING SYSTEM

[75] Inventor: Yong H. Hwang, Seoul, Rep. of Korea

[73] Assignee: SamSung Electronics Co., Ltd., Kyungki-do, Rep. of Korea

[21] Appl. No.: 900,436

[22] Filed: Jun. 18, 1992

[30] Foreign Application Priority Data

Jul. 23, 1991 [KR] Rep. of Korea .................... 91-12625

[51] Int. Cl.⁶ .............................................. G11B 7/00
[52] U.S. Cl. ......................................... 369/50; 369/43; 369/44.35; 369/47; 360/33.03
[58] Field of Search ............. 369/43, 50, 44.35, 44.34, 369/58, 47, 44.29, 44.25; 360/73.03, 78.07, 73.08, 73.09

[56] References Cited

U.S. PATENT DOCUMENTS

| | | | |
|---|---|---|---|
| 4,757,489 | 7/1988 | Yamagishi | 369/50 |
| 5,010,540 | 4/1991 | Fuji et al. | 369/50 |
| 5,109,369 | 4/1992 | Maeda et al. | 369/50 |
| 5,170,386 | 12/1992 | Tateishi | 369/50 |

FOREIGN PATENT DOCUMENTS

63-273221A 11/1988 Japan .................. 369/44.35

Primary Examiner—Georgia Y. Epps
Assistant Examiner—Muhammad N. Edun
Attorney, Agent, or Firm—Robert E. Bushnell

[57] ABSTRACT

A spindle motor control circuit for an optical recording and regenerating system is disclosed. The spindle motor control circuit adjusts the gains in response to the change of the position of the pickup for controlling the speed of the spindle motor to maintain the pickup at a constant line velocity regardless of the positions of the pickup so that the angular velocity of the spindle motor can have a constant line velocity during the pickup moves by driving the sled motor.

8 Claims, 4 Drawing Sheets

SPINDLE MOTOR CONTROL CIRCUIT FOR OPTICAL RECORDING AND REGENERATING SYSTEM

FIELD OF THE INVENTION

The present invention relates to a spindle motor control circuit for an optical recording and regenerating system, in which an angular velocity of a spindle motor can be so controlled as to maintain a pickup at a constant line velocity regardless of its positional displacement when moving the pickup by driving a sled motor.

BACKGROUND OF THE INVENTION

Generally, in a compact disc player (to be called "CDP" below), when a pickup of a CDP moves its position in response to driving a sled motor, if the pickup is to be maintained at a constant line velocity regardless of its displacing position, an angular velocity of the spindle motor which rotates the disc has to be controlled.

As shown in FIG. 1, conventionally, gain of the spindle motor is maintained constantly, so that the speed of the spindle motor can be linearly controlled to maintain a variation magnitude ($\Delta W$) of the angular velocity constantly for a same time period.

Relation between the angular velocity W, the track type line velocity v depending on rotation of the disc and a radius r depending on a position on a track of the disc is shown below by Formula (1).

$$W = \frac{v}{r} \quad (1)$$

The angular velocity W is inversely proportional to the radius r as shown in FIG. 2B, since the line velocity v is fixed in the range of 1.2–1.4 m/s for each disc. Therefore, even for a same travel distance, the variation magnitude $\Delta W$ of the angular velocity changes non-linearly depending on the position of the pickup.

Accordingly, if the control gain of the spindle motor is linearly constant, the angular velocity of the spindle motor to be controlled by the gain shows a variation relative to an actual angular velocity required for the relevant distance, as shown in FIG. 1.

Therefore, after a displacement of the pickup, the rotational line velocity of the spindle motor departs from the lock range of PLL (Phase Lock Loop) for controlling the CLV (Constant Linear Velocity), with the result that the data cannot be read out accurately, thereby making the system unreliable.

SUMMARY OF THE INVENTION

The present invention is intended to overcome the above described disadvantages of the conventional techniques.

Therefore, it is an object of the present invention to provide a spindle motor control circuit for an optical recording and regenerating system, in which the gain of the spindle motor is made variable in response to the position and travel distance of the pickup for controlling the CLV control stably.

It is another object of the present invention to provide a spindle motor control circuit for an optical recording and regenerating system, in which the angular velocity of the spindle motor is controlled to maintain the pickup at a constant line velocity regardless of the position of the pickup, when moving the pickup by driving a sled motor.

In achieving the above object, the spindle motor control circuit for an optical recording and regenerating system according to the present invention comprises a pickup unit for picking up recorded data from a disc, an RF amplifier for converting said data to electrical signals and for amplifying said electrical signals to output, a digital signal processor for shaping outpost signals of said RF amplifier into an EFM waveform and for demodulating them before providing them, a microcomputer for generating sled servo control signals, spindle servo control signals, deck mechanism control signals, and switching control signals for adjusting gains according to output data from said digital signal processor, a sled servo for producing sled servo signals according to said sled servo control signals output from said microcomputer, a sled motor driver means for driving a sled motor according to said sled servo signal output from said sled servo, a spindle servo for producing spindle servo signals according to said spindle servo control signals output from said microcomputer, a gain adjusting means for adjusting gains said spindle servo signals output from said spindle servo according to control signals output from said microcomputer, and a spindle motor driver means for driving a spindle motor according to said gain adjusted spindle servo signals from said gain adjusting means.

BRIEF DESCRIPTION OF THE DRAWINGS

The above objects and other advantages of the present invention will become more apparent by describing in detail a preferred embodiment of the present invention with reference to the attached drawings, in which.

DETAILED DESCRIPTION OF THE PREFERRED EMBODIMENT

The present invention will now be described in detail referring to the attached drawings.

Figure 3:
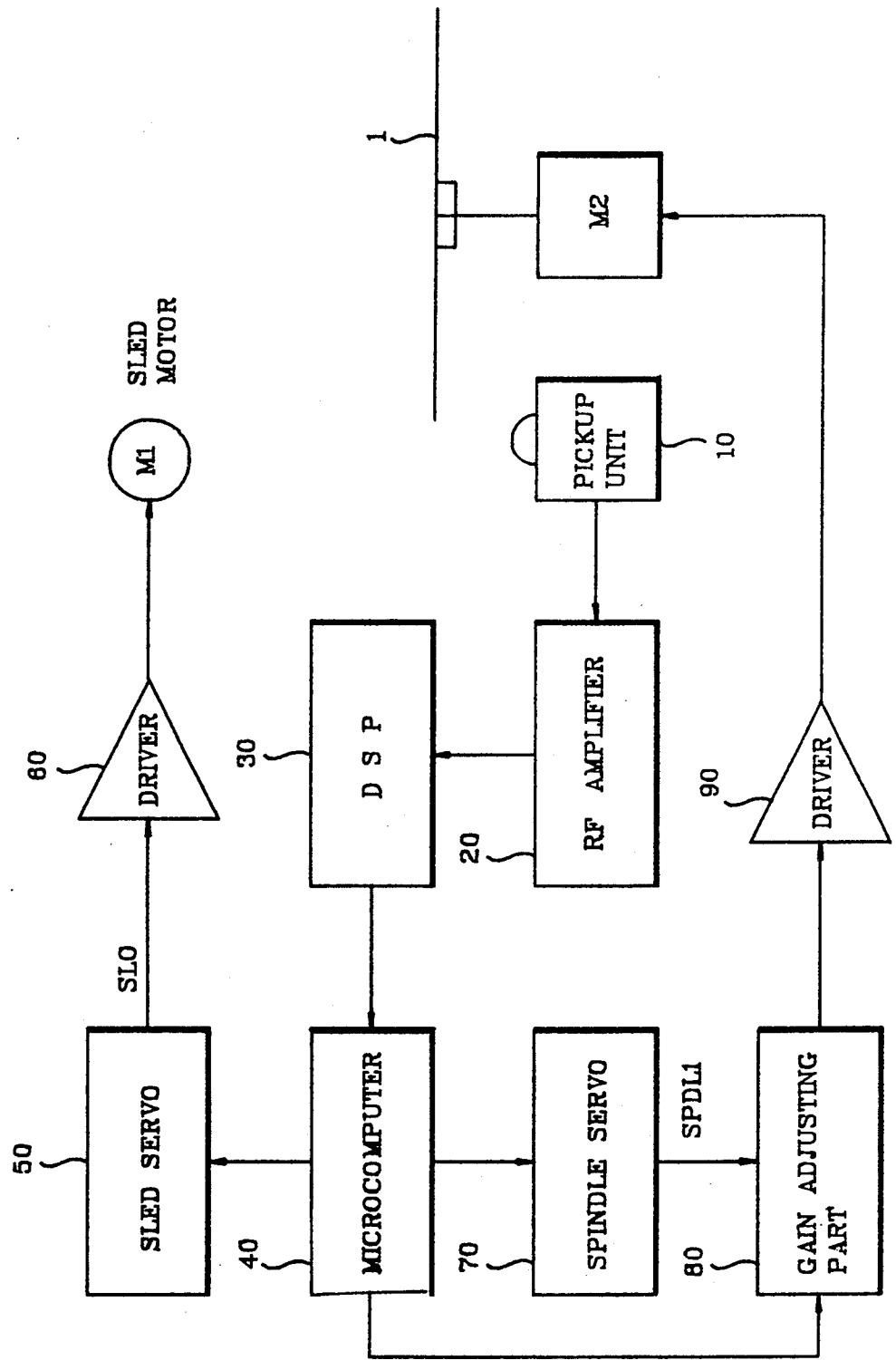
FIG. 3 is a block diagram showing a CDP according to the present invention.

Referring to FIG. 3, at a rear end of a pickup unit 10 which picks up recorded data from a disc 1 is connected an RF amplifier 20 for converting the pickup data to electrical signals to output. A DSP 30 is connected to a rear end of the RF amplifier 20, and shapes and demodulates the output signals from the RF amplifier 20. A microcomputer 40 is connected to a rear end of the DSP 30 and generates control signals based on the output data from the DSP 30. Further, the microcomputer 40 is connected to a sled servo 50 for producing sled servo signals according to sled servo control signals from the microcomputer 40. A sled motor driver 60 is connected to a rear end of the sled servo 50 and drives a sled motor M1 according to the sled servo signals.

Meanwhile, the microcomputer 40 is connected a spindle servo 70 for producing spindle servo signals according to spindle servo control signals supplied from the microcomputer 40. A gain adjusting part 80 is connected to the spindle servo 70 and adjusts gains according to the spindle servo signals and the control signals output from the microcomputer 40. A spindle motor driver 90 is connected to the gain adjusting section 80 and drives a spindle motor M2 according to the gain-adjusted spindle servo signals.

Figure 4:
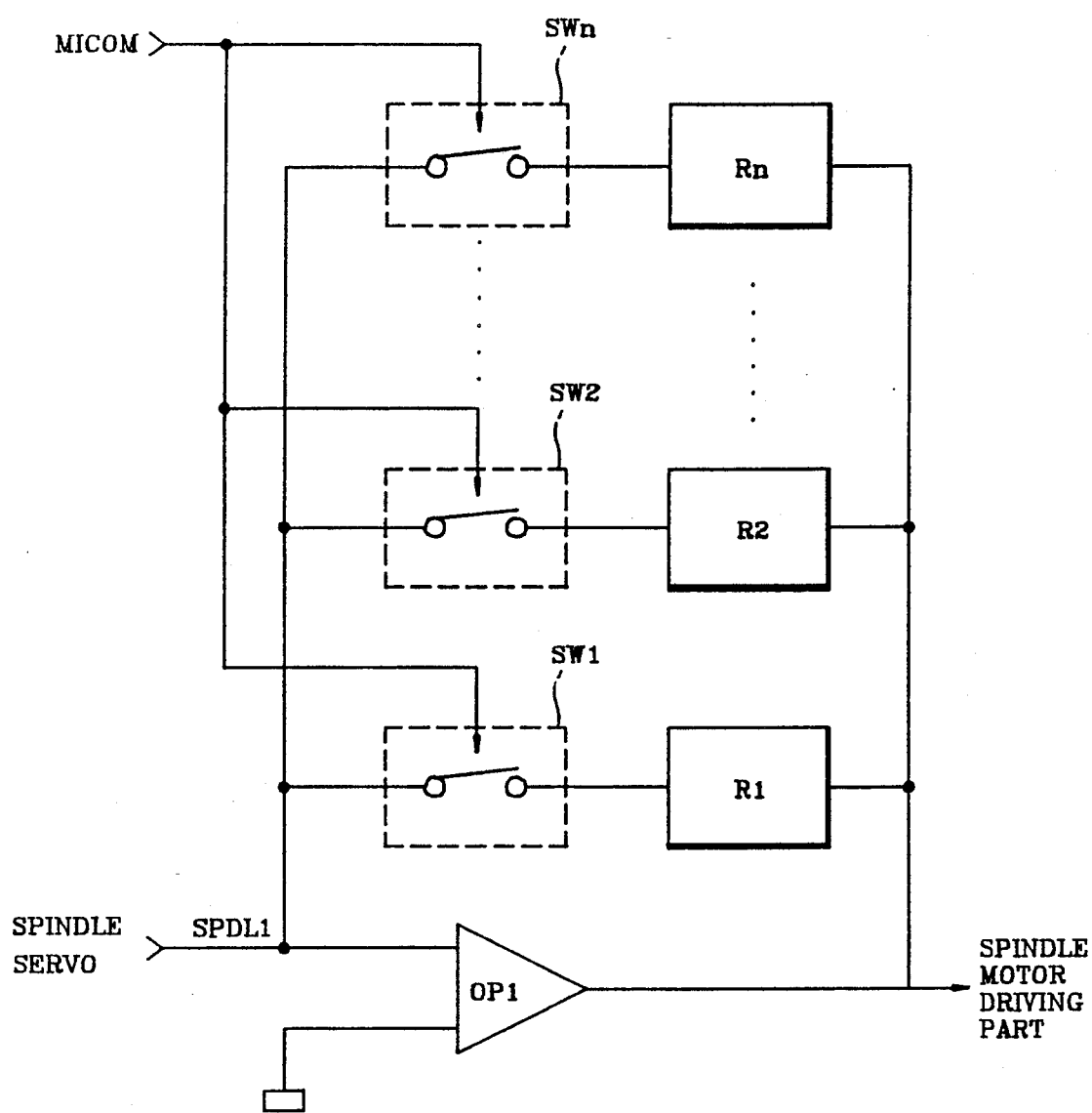
FIG. 4 is a circuit diagram of a gain adjusting part 80 of FIG. 3.

FIG. 4 illustrates the gain adjusting part 80 of FIG. 3 in detail. As shown in FIG. 4, this gain adjusting part 80 comprises a plurality of switches SW1–SWn for switching on and off according to switching control signals from the microcomputer 40 after receipt of the spindle servo signals in parallel, a plurality of resistors R1–Rn connected in parallel for setting resistance values according to switching conditions of the plurality of the switches SW1–SWn, and an arithmetic amplifier OP1 for adjusting the gains of the spindle servo signals according to the resistance values set by the plurality of the resistors R1–Rn.

Figure 1:
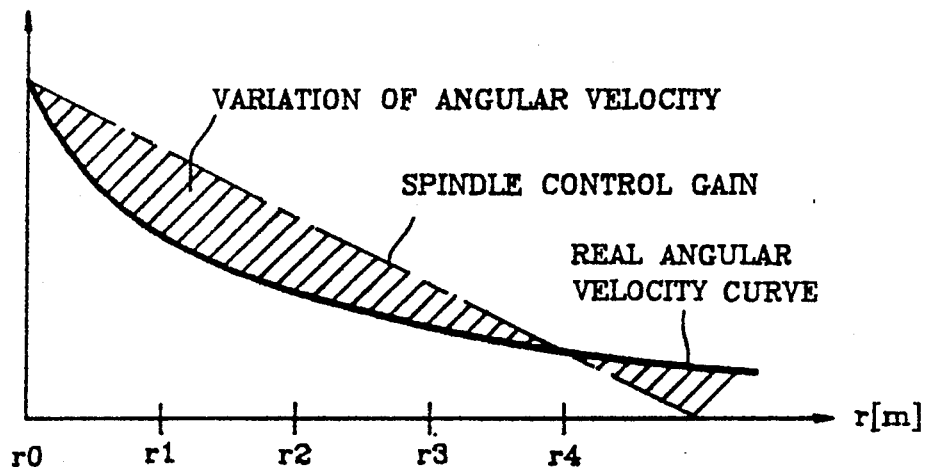
FIG. 1 illustrates variation of spindle angular velocity between spindle control gains and real angular velocity.
Figure 5A:
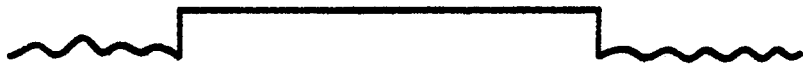
FIGS. 5A~5C illustrate waveforms of spindle control signals according to selection of switches.
Figure 5B:
Figure 5C:
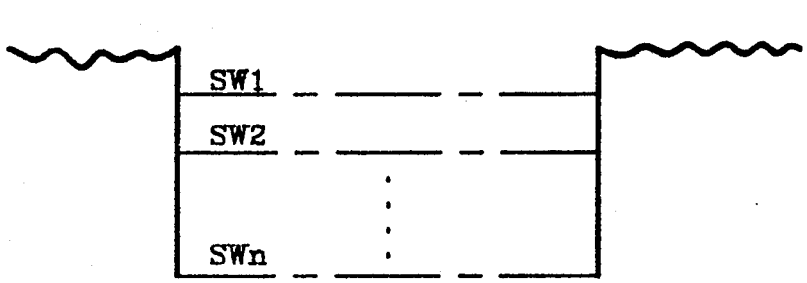

FIG. 5 illustrates waveforms of the spindle servo signals as decided by the selections of the switches SW1–SWn of FIG. 4.

In the spindle motor control circuit of the present invention as described above, if the pickup unit 10 picks up and outputs the data from the disc 1, the RF amplifier 20 converts the data to electrical signals. Then, the electrical signals are amplified by the RF amplifier 20 and applied to the DSP 30, where the signals are shaped into an EFM (Eight To Fourteen) waveform. If the EFM-shaped signals are input to the microcomputer 40, the microcomputer 40 senses an absolute time recorded on a servo code.

Further, when the pickup of the pickup unit 10 moves, the microcomputer 40 can detect the arrival position of the pickup in an absolute time. Therefore, when the microcomputer 40 drives the sled motor M1 by providing a sled servo control signal for moving the pickup of the pickup unit 10, the sled servo 50 outputs a sled servo signal as shown in FIG. 5A. When the sled servo signal output from the sled servo 50 is supplied to the sled motor driver 60 for driving it, the pickup unit 10 crosses the tracks of the disc. In this case, the speed of the spindle motor M2 has to be varied for maintaining the tracking line velocity of the pickup unit 10 at a constant value before and after the movement of the pickup.

Therefore, when the pickup moves outwardly on the disc, the velocity is lowered, while, when the pickup moves inwardly on the disc, the velocity is increased, since the microcomputer 40 outputs a sled servo control signal. Therefore, the microcomputer 40 detects the position to move to, immediately before the movement.

Figure 2A:
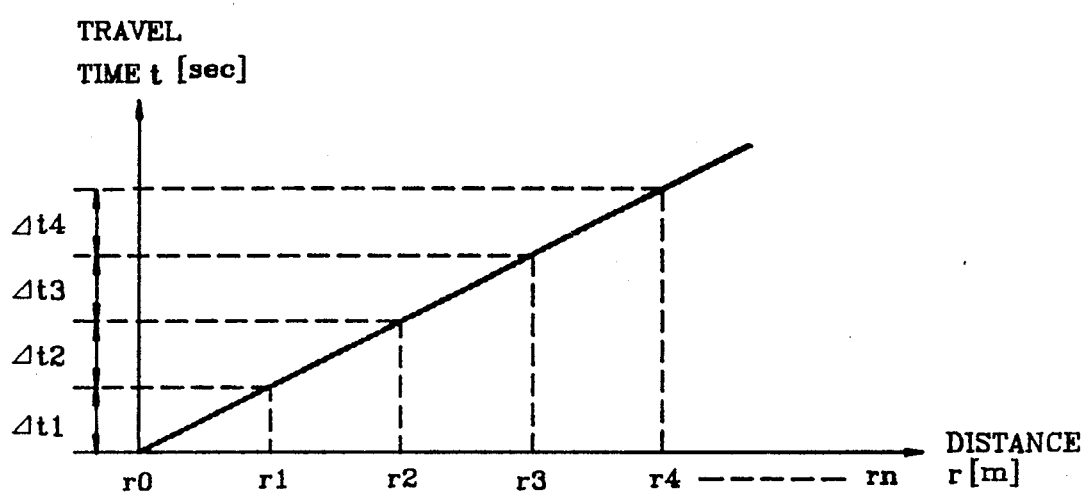
FIGS. 2A and 2B illustrate waveforms of spindle angular velocity and travel time relating to distance.
Figure 2B:
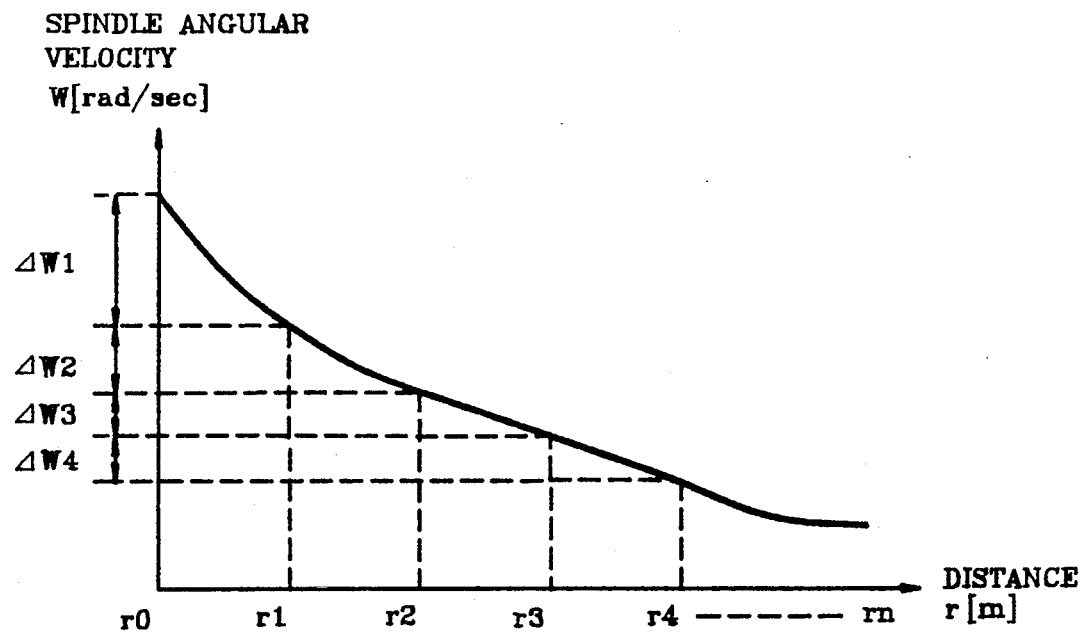

The microcomputer 40 determines to which section the current position belong in the n-sections of FIG. 2A for normalizing with a mean value of the determined section. Further, the microcomputer 40 sets a mean value m of a section to be used and decides the gain between the two sections.

Therefore, the microcomputer 40 outputs switching signals for controlling the gains which may arise between each section. The switching control signals output from the microcomputer 40 for a desired gain switches the plurality of the switches SW1–SWn of FIG. 4. Then, according to the turning on or off of the plurality of the switches SW1–SWn, a resistance value is decided through the combination of the plurality of resistors R1–Rn, and the gain is adjusted by the arithmetic amplifier OP1 as shown in FIG. 5. The gain-adjusted signals are supplied to the spindle motor driving part 30 for controlling the speed of the spindle motor M2.

Therefore, when the movement of the pickup of the pickup device 10 is terminated, the CLV is driven in a stable manner, and the rotation speed of the spindle motor M2 falls within the control range.

According to the present invention as described above, when moving the pickup by driving the sled motor in an optical recording and regenerating system, the speed of the spindle motor is controlled by deciding the gains in response to the positions of the pickup so that a constant line velocity can be maintained regardless of the change positional displacement of the pickup.

The invention is not limited to the embodiment described hereinabove Various modifications of disclosed embodiment as well as other embodiments of the invention will become apparent to persons skilled in the art upon reference to the description of the invention. It is therefore contemplated that the appended claims will cover any such modifications of embodiments as fall within the true scope of the invention.

What is claimed is:

1. A spindle motor control system in an optical recording and regenerating system, comprising:
   a pickup unit for picking up recorded data from a disc storing said recorded data;
   an RF amplifier for converting said data to electrical signals and for amplifying said electrical signals for output;
   a digital signal processor for shaping output signals from said RF amplifier into EFM waveforms and for providing output data by demodulating said EMF waveforms;
   a microcomputer for generating sled servo control signals to control positioning of said pickup unit in any one of a plurality of locations to enable reading of said recorded data in response to position information, for generating spindle servo control signals based on said position information, for generating deck mechanism control signals, and for generating switching control signals for adjusting gains according to output data from said digital signal processor;
   sled servo means for generating sled servo signals according to said sled servo control signals;
   a sled servo motor driver for driving a sled motor according to said sled servo signals output from said sled servo means to position said pickup unit;
   spindle servo means for generating spindle servo signals according to said spindle servo control signals;
   gain controlling means for receiving spindle servo signals from said spindle servo to control gains according to said switching control signals; and
   spindle motor driving means for driving a spindle motor according to gain controlled spindle servo signals from said gain controller means to change the angular velocity of said spindle motor and to maintain constant the linear velocity of a spindle driven by said spindle motor in dependance upon the position of said pickup unit.

2. The spindle motor control circuit as claimed in claim 1, wherein said gain controlling means comprises:
   a plurality of switches for switching on and off according to said switching control signals;
   a plurality of resistors serially connected to respective ones of said switches; and
   an arithmetic amplifier having one input coupled to receive said spindle servo signals and an output for providing said gain controlled spindle servo signals to said spindle motor, said serially coupled switches and resistors being coupled in parallel between said one input and said output of said arithmetic amplifier for adjusting said gains of said spindle servo signals according to a resistance value set by said serially connected resistors in accordance with said switches being switched on or off in response to said switching control signals.

3. A spindle motor control system in an optical recording and regenerating system, comprising:

means for controlling the position of a pickup unit for picking up recorded data from a disc; and means for varying the angular velocity of a spindle motor in response to the position of said pickup unit, said means for varying the angular velocity of said spindle motor comprising:

microcomputer means for generating spindle servo control signals and gain switching signals in response to position information determined from a current position of said pickup unit;

spindle servo means for generating spindle servo signals in response to said spindle servo control signals;

gain adjusting means receiving said spindle servo signals, and for adjusting the gain of said spindle servo signals in response to said gain switching signals; and spindle driver means for adjusting said angular velocity of said spindle motor in response to the gain adjusted spindle servo signals.

4. The spindle motor control system as set forth in claim 3, wherein said means for controlling the position of said pickup unit comprises:

said microcomputer means for generating sled servo control signals;

sled servo means for generating sled servo signals in response to said sled servo control signals; and driver means for driving a sled motor for positioning said pickup unit in response to said sled servo signals.

5. The spindle motor control system as set forth in claim 4, wherein said gain adjusting means comprises:

amplifier means having one input for receiving said spindle servo signals and an output for outputting said gain adjusted spindle servo signals; and a plurality of switchable resistance means connected in parallel between said one input and said output of said amplifier means, each of said switchable resistance means being controlled to provide either a corresponding resistance value or an infinite resistance value in response to said gain switching signals.

6. The spindle motor control system as set forth in claim 5, wherein each of said switchable resistance elements comprises a switch serially connected to a corresponding resistor.

7. The spindle motor control system as set forth in claim 3, wherein said gain adjusting means comprises:

amplifier means having one input for receiving said spindle servo signals and an output for outputting said gain adjusted spindle servo signals; and a plurality of serially coupled switches and resistors connected in parallel between said one input and said output of said amplifier means, said switches being controlled in response to said gain switching signals.

8. A method for controlling the angular velocity of a spindle motor in an optical recording and regenerating system having a radially positionable pickup unit, said method comprising the steps of:

determining a current position of said pickup unit and a desired position to be attained by said pickup unit;

generating a spindle servo signal and gain switching signals in response to said current and desired positions determined in said determining step;

providing by a gain controlled spindle servo signal adjusting the gain of said spindle servo signal in response to said gain switching signals; and adjusting the angular velocity of said spindle motor in response to said gain controlled spindle servo signal.

* * * * *